(12) United States Patent
Whitsell

(10) Patent No.: US 9,545,874 B1
(45) Date of Patent: Jan. 17, 2017

(54) BUNDLING AND TRANSPORTING ELONGATED ARTICLES

(71) Applicant: Whitsell Manufacturing, Inc., Cottage Grove, OR (US)

(72) Inventor: Fred W. Whitsell, Creswell, OR (US)

(73) Assignee: WHITSELL MANUFACTURING, INC., Cottage Grove, OR (US)

( * ) Notice: Subject to any disclaimer, the term of this patent is extended or adjusted under 35 U.S.C. 154(b) by 0 days.

(21) Appl. No.: 14/811,772

(22) Filed: Jul. 28, 2015

(51) Int. Cl.
*B60P 7/08* (2006.01)
*B60P 7/12* (2006.01)
*B65B 27/10* (2006.01)
*B60P 3/41* (2006.01)

(52) U.S. Cl.
CPC .. *B60P 7/12* (2013.01); *B60P 3/41* (2013.01); *B60P 7/0823* (2013.01); *B65B 27/10* (2013.01)

(58) Field of Classification Search
CPC ............. B60P 7/12; B60P 3/41; B60P 7/0823; B65B 27/10
USPC .... 410/32, 34, 35, 36, 37, 42, 97, 100, 120; 248/68.1
See application file for complete search history.

(56) References Cited

U.S. PATENT DOCUMENTS

| 2,012,220 | A | | 8/1935 | Chambers |
| 2,214,173 | A | | 9/1940 | Nebe |
| 2,248,119 | A | | 7/1941 | Reed et al. |
| 3,091,193 | A | * | 5/1963 | Thomas ................ B60P 3/41 105/386 |
| 3,141,482 | A | | 7/1964 | Arness |
| 3,157,424 | A | | 11/1964 | Hall |
| 3,220,583 | A | | 11/1965 | Robertson |
| 5,269,639 | A | | 12/1993 | Ryder |
| 5,893,468 | A | | 4/1999 | Holmes |
| 6,050,761 | A | | 4/2000 | Keip et al. |
| 7,794,188 | B2 | | 9/2010 | Whitehead et al. |
| 2001/0029847 | A1 | | 10/2001 | Tweten |
| 2002/0009345 | A1 | | 1/2002 | Clive-Smith |
| 2002/0150438 | A1 | * | 10/2002 | Coray ................ B60P 3/41 410/37 |

* cited by examiner

*Primary Examiner* — Stephen Gordon
(74) *Attorney, Agent, or Firm* — David S. Alavi

(57) ABSTRACT

Bundling multiple elongated articles comprises: loading the articles into a stationary bunk rack; positioning pairs of bundling members vertically against opposing sides of the articles in the bunk rack; wrapping flexible binding members around the bundling members and the articles in the bunk rack; tensioning and securing the binding members. Each pair of bundling members has a corresponding binding members positioned around them. Tensioning the binding members urges the bundling members against the opposing sides of the bundle, so that the bundle assumes a shape that is (i) substantially flat over portions of an outer bundle surface against the binding members and (ii) convex over portions of the outer bundle surfaces that are not against the binding members. Securing the tensioned binding members secures the bundle and the bundling members together. The elongated articles can assume an irregular arrangement over portions of a bundle cross-section.

20 Claims, 10 Drawing Sheets

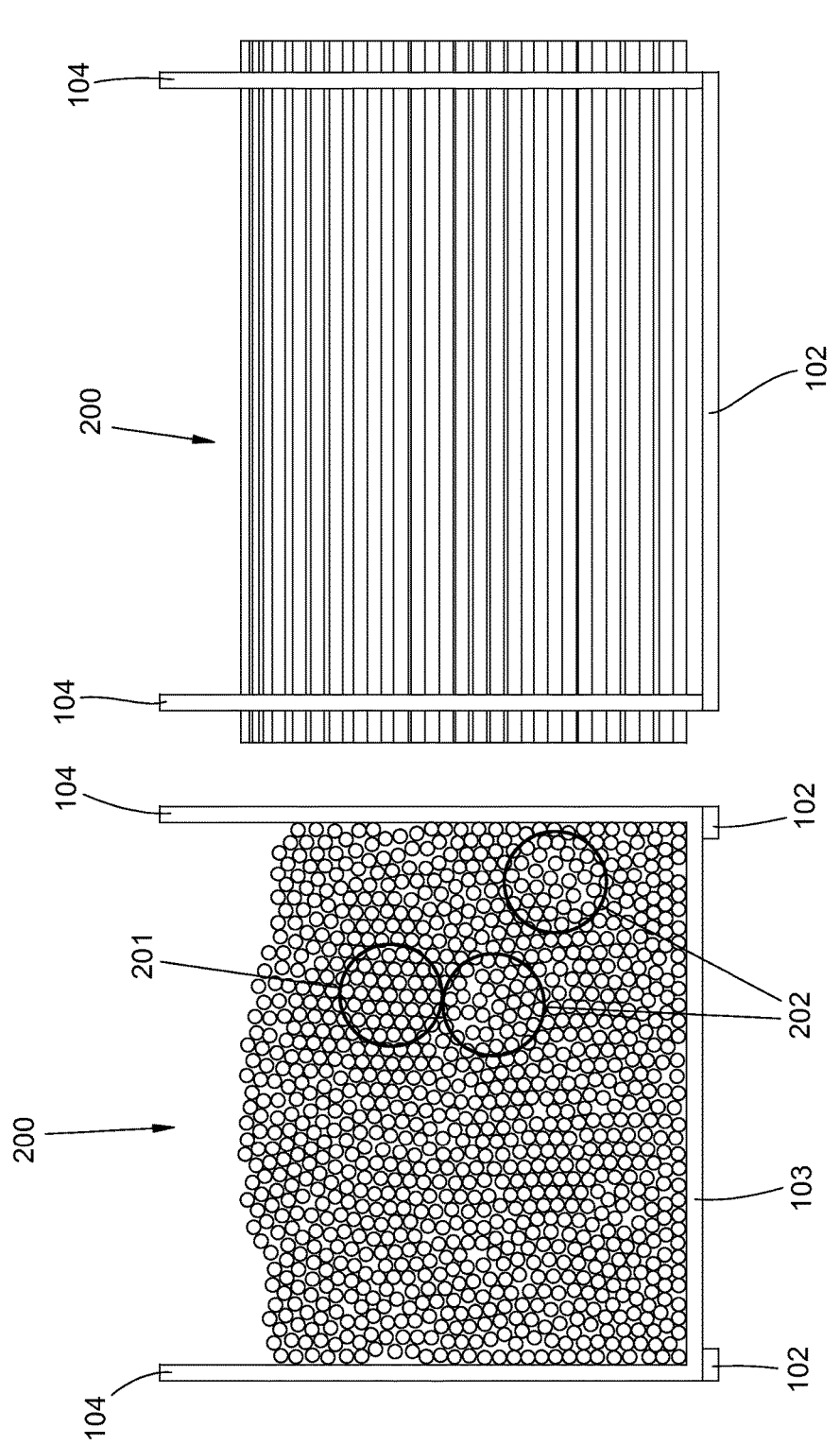

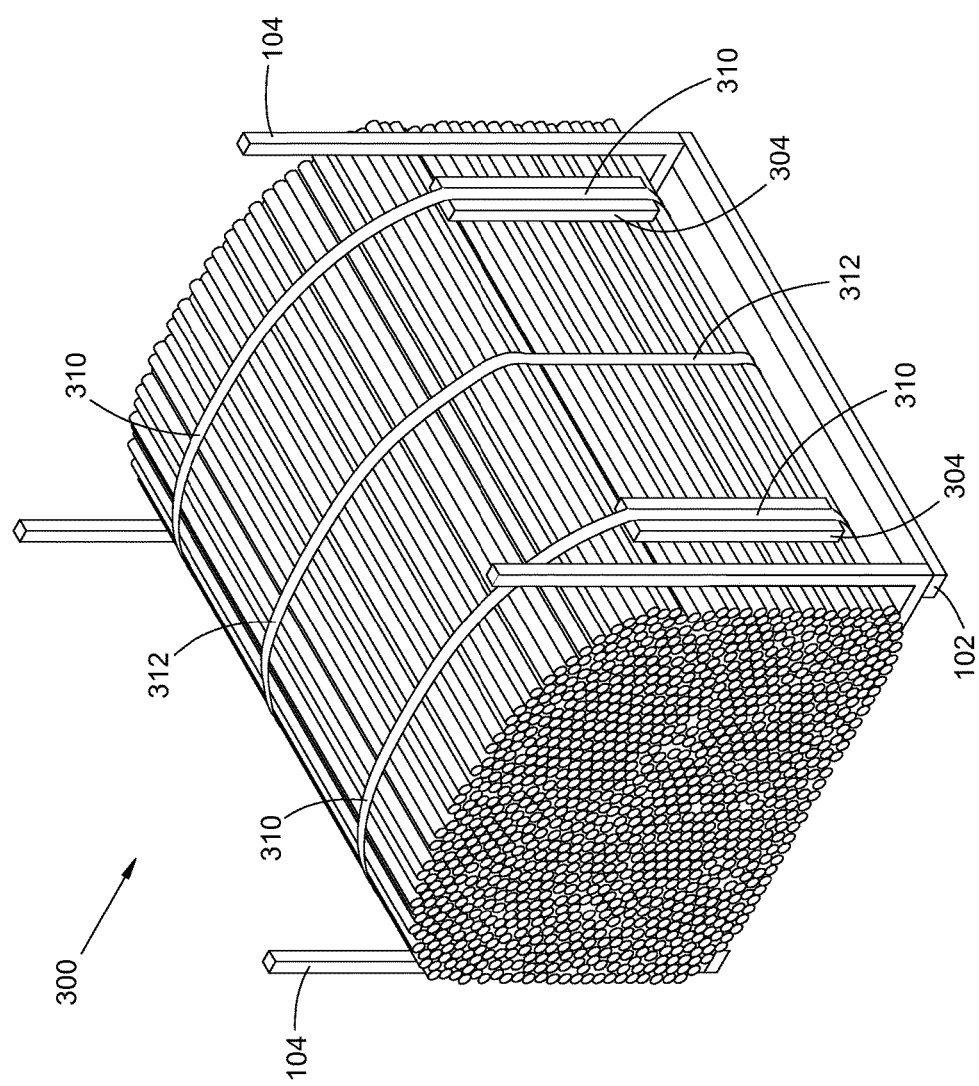

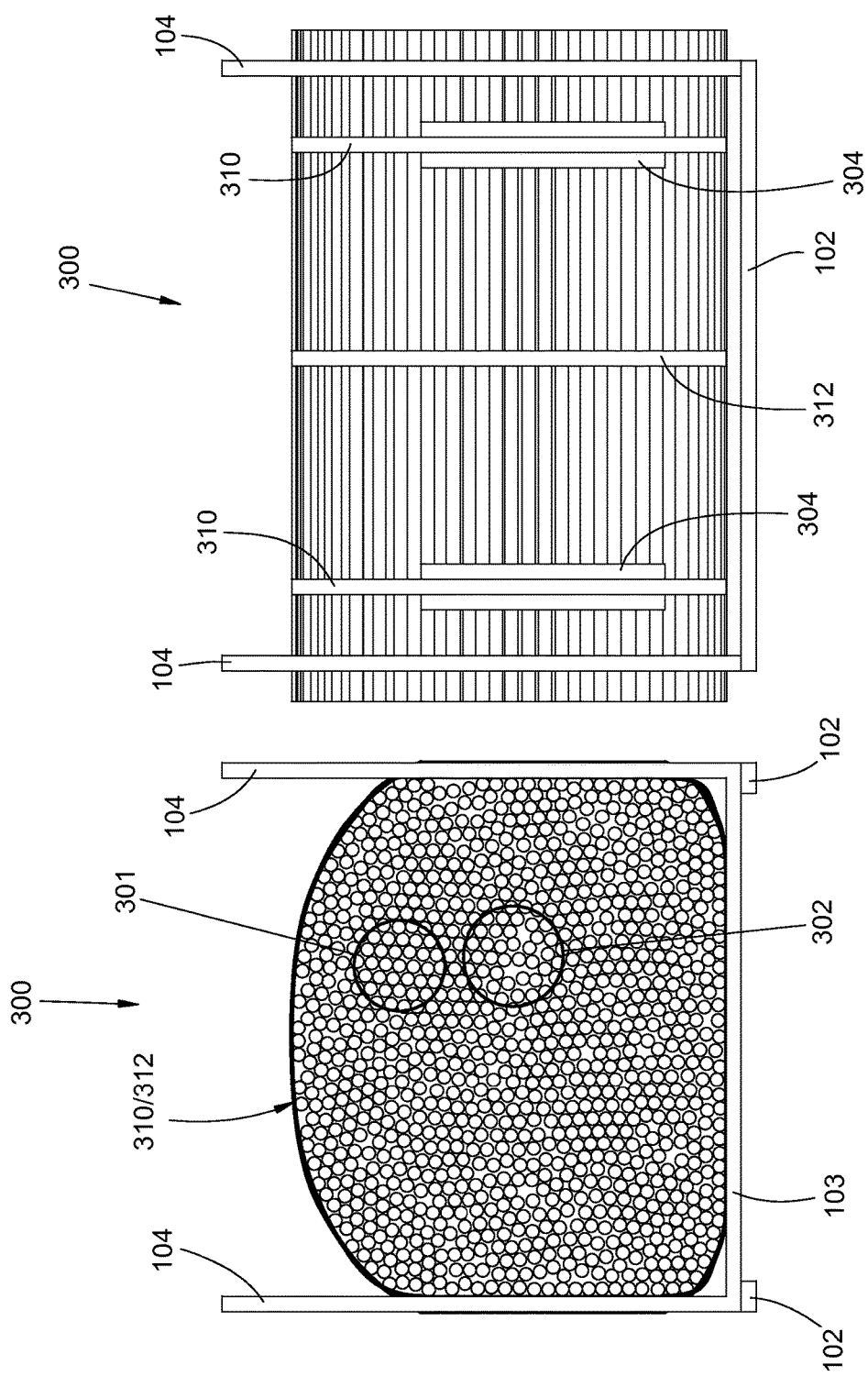

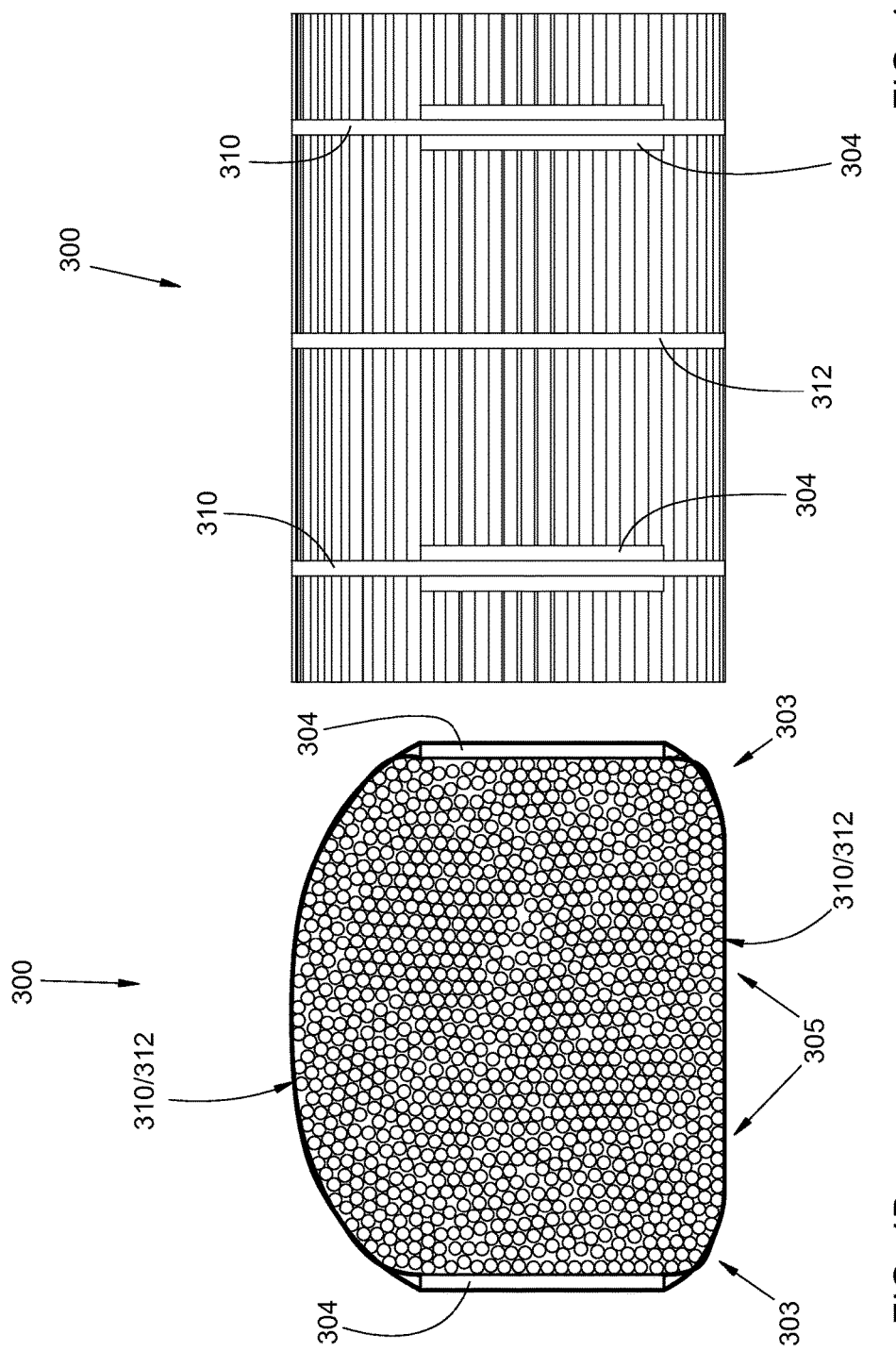

BUNDLING AND TRANSPORTING ELONGATED ARTICLES

FIELD OF THE INVENTION

The field of the present invention relates to bundling and transporting cargo. In particular, methods and apparatus are disclosed herein for bundling and transporting multiple elongated articles.

BACKGROUND

Some examples of methods and apparatus for bundling and transporting cargo are disclosed in:
- U.S. Pat. No. 2,012,220 entitled "Method of storing and dispensing lumber" issued Aug. 20, 1935 to Chambers;
- U.S. Pat. No. 2,214,173 entitled "Shipping unit" issued Sep. 10, 1940 to Nebe;
- U.S. Pat. No. 2,248,119 entitled "Method and apparatus for assembling and shipping rods" issued Jul. 8, 1941 to Reed et al;
- U.S. Pat. No. 3,141,482 entitled "Core mill" issued Jul. 21, 1964 to Arness;
- U.S. Pat. No. 3,157,424 entitled "Storage rack" issued Nov. 17, 1964 to Hall;
- U.S. Pat. No. 3,220,583 entitled "Bundling of elongated articles" issued Nov. 30, 1965 to Robertson;
- U.S. Pat. No. 5,269,639 entitled "System for shipping products and stabilizing them from shifting sidewise on vehicle" issued Dec. 14, 1993 to Ryder;
- U.S. Pat. No. 5,893,468 entitled "Storage rack system" issued Apr. 13, 1999 to Holmes;
- U.S. Pat. No. 6,050,761 entitled "Shipping container system for stabilizing flexible loads" issued Apr. 18, 2000 to Keip et al;
- U.S. Pat. No. 7,794,188 entitled "Method, apparatus and system for pre-bunking cut timber and transporting wood residuals" issued Sep. 14, 2010 to Whitehead et al;
- U.S. Pub. No. 2001/0029847 entitled "Rack for producing transport bundles of stacked lumber, and bundle production" published Oct. 18, 2001 in the name of Tweten; and
- U.S. Pub. No. 2002/0009345 entitled "Cargo container" published Jan. 24, 2002 in the name of Clive-Smith.

"Peeler cores" are small diameter log remnants left over after a log has been "peeled" to yield thin plies for making plywood or veneers. They are a relatively low value wood byproduct; nevertheless, there is a market for peeler cores. Because of their small diameter and short length (relative to, e.g., unsawn logs), special arrangements must be made for their shipment (compared to, e.g., unsawn logs or finished lumber products). The low value of the cores puts a limit on the costs suppliers and purchasers are willing to bear to ship the cores.

In one conventional method for shipping peeler cores, custom made "bunk racks" are welded to flatbed trailers, in an arrangement similar to log truck trailers. The purchaser or supplier of the peeler cores, or a trucking company, must have such trailers custom made, which then spend much time sitting empty or partly filled at the core mill. The supplier fills the bunks with loose peeler cores and calls for trucks to pull out the bunk trailers once filled. The trucking company will often have an empty bunk trailer to bring and drop off when picking up the full trailer. This is a costly system for shipping peeler cores long distances, because it is effectively a two-way shipment (one way full and one way empty); typically the cost of freight for this method is double that of a one way haul.

In a conventional method disclosed in, e.g., U.S. Pat. No. 5,893,468, a storage rack system suitable for transporting peeler cores or other such elongated items includes mobile carriages (i.e., bunk racks) that can be detached from a trailer for filling while the trailer is used for other purposes. Once filled, the mobile carriages are secured to the trailer and transported from the supplier location to the purchaser location. However, the empty carriages still must be transported empty back to the supplier location. In another conventional method disclosed in, e.g., U.S. Pat. No. 7,794,188, a storage rack system suitable for transporting peeler cores or other such elongated items includes foldable or retractable bunk members that enable the trailer to be used for other purposes. The trailer is still tied up while it sits empty or only partly filled at the supplier location.

In other conventional methods disclosed in, e.g., U.S. Pat. No. 2,248,119, U.S. Pat. No. 3,220,583, or U.S. Pat. No. 5,269,639, peeler cores or other elongated items are "unitized" into a regular, polygonal bundle, in some cases with supporting members strapped to the bundle to maintain its shape. Such regular bundles can be loaded onto standard flatbed trucks or trailers for shipment, thereby eliminating the two-way shipment costs associated with methods described above. However, assembling the regular arrays of articles required for these methods is quite time consuming and labor intensive, often to an extent that substantially negates any savings realized in the shipping costs.

It would be desirable to develop methods that enable more economical bundling, loading, and shipping of peeler cores or other elongated articles.

SUMMARY

An inventive method for bundling multiple elongated articles comprises: (a) loading the articles into a stationary bunk rack so as to form a bundle; (b) positioning pairs of bundling members vertically against opposing sides of the bundle in the bunk rack; (c) wrapping flexible binding members around the bundling members and the bundle in the bunk rack; (d) tensioning the binding members; and (e) securing the tensioned binding members. The articles in the stationary bunk rack form a bundle in which the elongated articles lie substantially horizontal and substantially parallel to one another. The bundling members are substantially rigid and substantially straight, and are positioned substantially vertically against opposing sides of the bundle in the bunk rack with the bundling members of each pair positioned across from each other on the opposing sides of the bundle; each pair of bundling members has a corresponding binding member positioned around them. Tensioning the binding members urges the corresponding pairs of bundling members against the opposing sides of the bundle, so that the bundle assumes a shape that is (i) substantially flat over those portions of an outer bundle surface that are against the binding members and (ii) convex over one or more portions of the outer bundle surfaces that are not against the binding members. Securing the tensioned binding members secures the bundle and the bundling members together. Over one or more portions of a transverse cross section of the secured bundle, the elongated articles of the bundle can assume an irregular arrangement.

The inventive method can further comprise: (f) lifting the secured bundle out of the bunk rack and placing it on a substantially flat truck or trailer bed with the bundling members oriented substantially vertically; and (g) securing the bundle to the truck or trailer bed with one or more straps, bands, chains, bindings, or tie-downs. The elongated articles can be substantially cylindrical, can be peeler cores, or can be other elongated shapes or articles.

Objects and advantages pertaining to bundling and transporting elongated articles may become apparent upon referring to the example embodiments illustrated in the drawings and disclosed in the following written description or appended claims.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIGS. 2A, 2B, and 2C are isometric, end, and side views, respectively, of a stationary bunk rack holding an unsecured bundle of multiple elongated articles according to the example inventive method.

FIGS. 3A, 3B, and 3C are isometric, end, and side views, respectively, of a stationary bunk rack holding a secured bundle of multiple elongated articles according to the example inventive method.

FIGS. 4A, 4B, and 4C are isometric, end, and side views, respectively, of the secured bundle of multiple elongated articles removed from the stationary bunk rack according to the example inventive method.

The embodiments depicted are shown only schematically: all features may not be shown in full detail or in proper proportion, certain features or structures may be exaggerated relative to others for clarity, and the drawings should not be regarded as being to scale. The embodiments shown are only examples: they should not be construed as limiting the scope of the present disclosure or appended claims.

DETAILED DESCRIPTION OF EMBODIMENTS

Figure 1A:
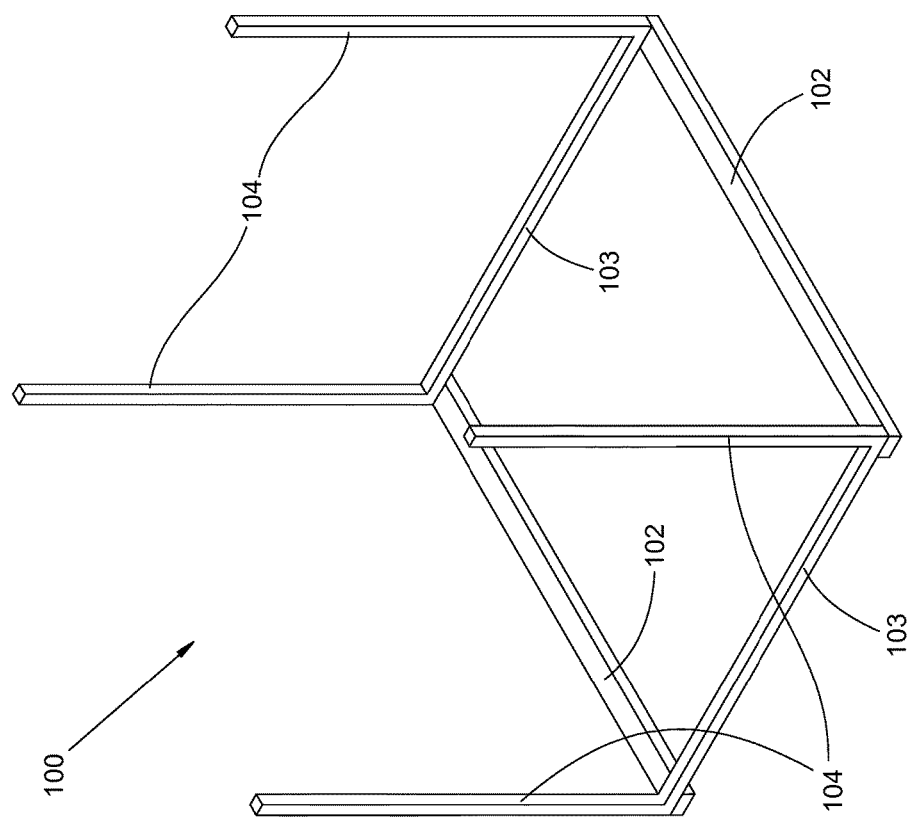
FIGS. 1A, 1B, and 1C are isometric, end, and side views, respectively, of a stationary bunk rack employed in an example of an inventive method.
Figure 1C:
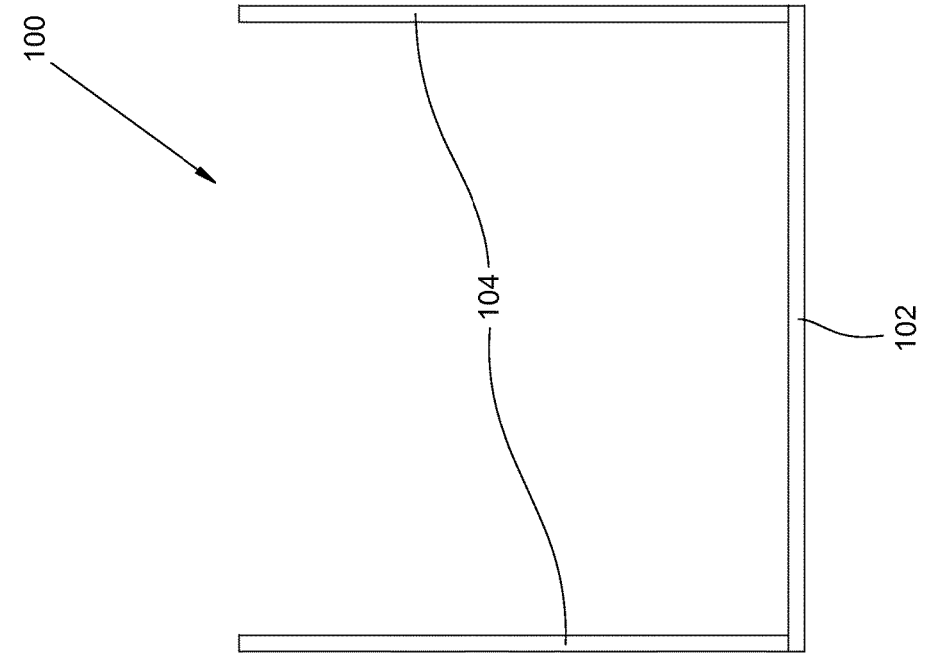
Figure 1B:
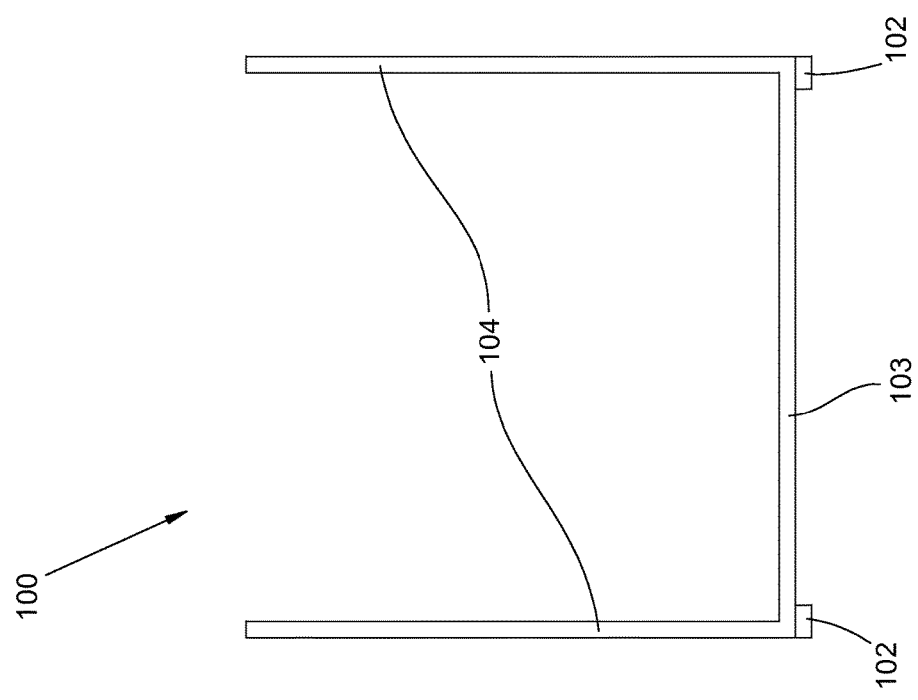
Figure 2A:
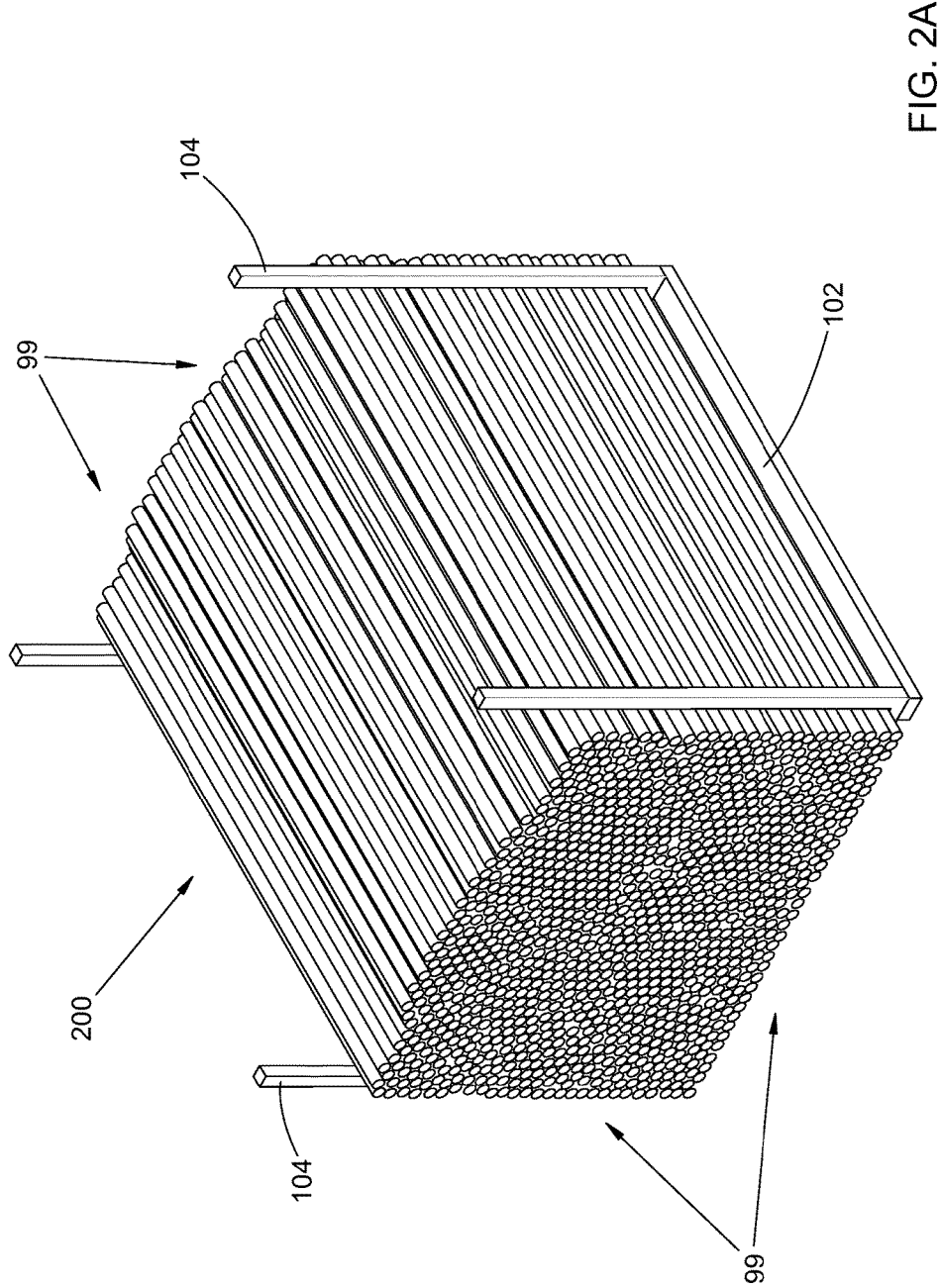

A stationary bunk rack 100 with substantially horizontal base members 102, cross members 103, and substantially vertical rack members 104 (FIGS. 1A/1B/1C) is placed at a supplier location and is gradually filled with peeler cores 99 (or other elongated articles to be bundled and transported; such elongated articles may or may not be substantially cylindrical) until a sufficient number have been accumulated (FIGS. 2A/2B/2C). The peeler cores 99 can be dropped or placed into the bunk rack 100 without any particular arranging or stacking. The resulting unsecured bundle 200 in the bunk rack 100 includes multiple peeler cores 99 lying substantially horizontally and substantially parallel to one another. Directional references used herein, such as sides, ends, longitudinal, transverse, and so on, are defined relative to a longitudinal axis corresponding roughly to the long dimension (i.e., length) of the substantially parallel peeler cores 99 (or other elongated objects) in the unsecured bundle 200 or the secured bundle 300 discussed below. A transverse cross section (or an end view, as in FIG. 2B) of the unsecured bundle 200 will typically include portions 201 wherein some of the peeler cores 99 form a regular arrangement (e.g., a hexagonal array). Because no particular arranging or stacking of the peeler cores 99 in the bunk rack 100 is employed, the transverse cross section (or end view, as in FIG. 2B) of the unsecured bundle 200 will include other portions 202 in which the peeler cores 99 are arranged irregularly. Although the peeler cores are all shown as having the same length and as being lined up with one another longitudinally, that need not be the case; bundles of peeler cores of varying lengths and varying longitudinal offsets from the rest of the bundle fall within the scope of the present disclosure or appended claims.

When the bunk rack 100 is sufficiently full (e.g., a few dozen up to several hundred peeler cores, as needed or desired), the peeler cores 99 therein can be formed into a secured bundle 300. Two or more pairs of substantially rigid, substantially straight bundling members 304 are positioned across from each other substantially vertically against opposing sides of the unsecured bundle 200 (FIGS. 3A/3B/3C). Two pairs of bundling members 304 are often sufficient; additional pairs can be employed if needed or desired. The sides of the unsecured bundle 200 are kept substantially flat by the vertical rack members 104, so the substantially straight bundling members 304 can be positioned flat against those flat sides of the unsecured bundle 200. The bundling members 304 can comprise wood, metal, plastic, composite, combinations thereof, or other suitably rigid, suitably strong material. In some examples, the bundling members 304 comprise 2×6 dimensional lumber cut to a suitable length, e.g., about 3 or 4 feet long. Bundling members 304 that are slightly curved due to, e.g., flexing or bending during the bundling process, or normal warping exhibited by dimensional lumber, shall nevertheless be considered "substantially straight" for purposes of the present disclosure or appended claims.

With the pairs of bundling members 304 positioned against the opposing flat sides of the unsecured bundle 200, flexible binding members 310 are wrapped around the bundle 200 in the bunk rack 100 and then tensioned to form a secured bundle 300 (FIGS. 3A/3B/3C). Each pair of bundling members 304 has a corresponding one of the binding members 310 positioned around the corresponding pair of bundling members 304. In other words, each such binding member 310 encircles the bundle 200/300 with a pair of opposing bundling members 304 between the binding member 310 and a portion of each flat side of the bundle 200/300. Additional flexible binding members 312 can be employed that encircle the bundle 200/300 but do not also encircle any of the bundling members 304. The flexible binding members 310 (and 312, if present) can comprise bands, straps, chains, other binding member comprising metal, alloy, plastic, fiber, combinations thereof, or other any suitably flexible, suitably strong material. So-called railroad banding is one example of a suitable binding member 310 (or 312, if present).

Figure 4A:
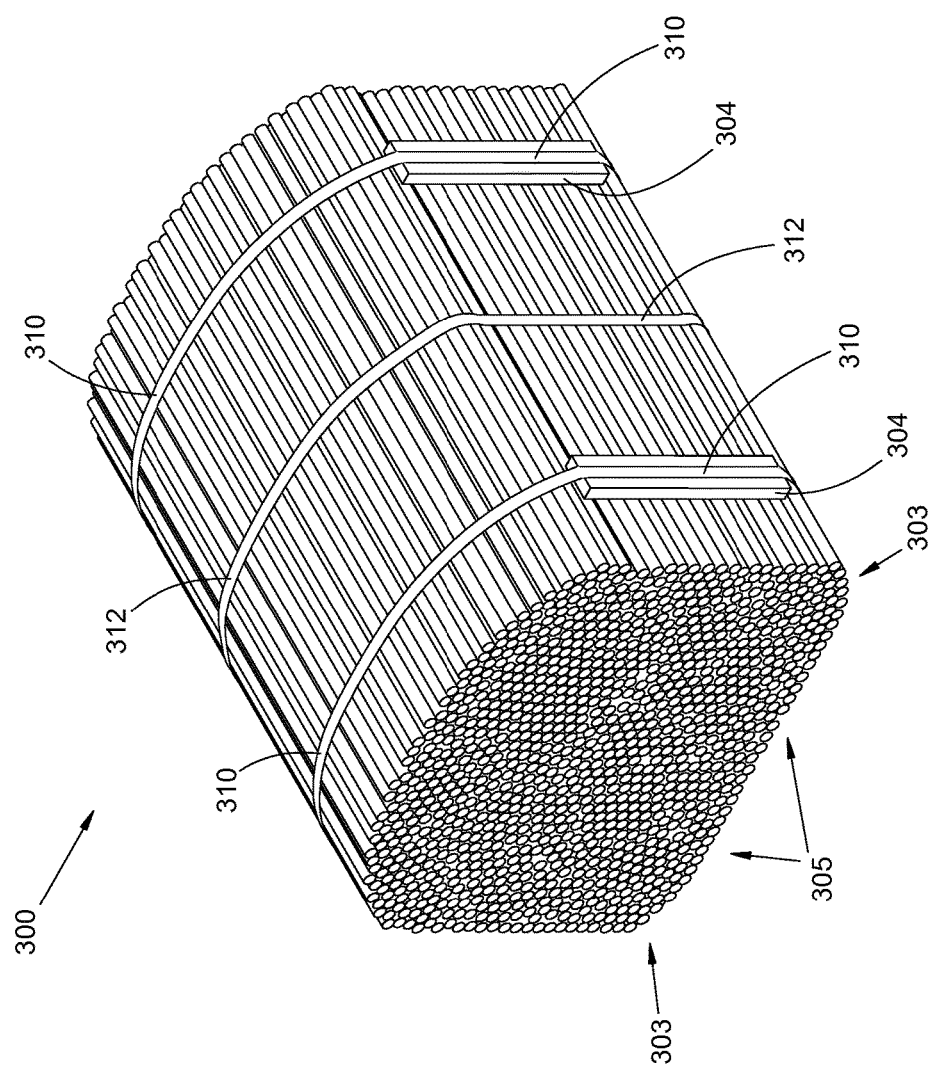

Once in position around the bundle 200 and the bundling members 304, the binding members 310 are tensioned and secured to form the secured bundle 300. Any suitable tensioning tool or mechanism can be employed (e.g., a ratchet-based mechanism or a friction-based mechanism), and any suitable securing member or mechanism can be employed (e.g., a crimp, seal, buckle, or latch). Tensioning the binding members 310 urges the corresponding pairs of bundling members 304 against the opposing sides of the unsecured bundle 200, so that the secured bundle 300 assumes a shape that is (i) substantially flat over those portions of its outer surface that are against the binding members 304 and (ii) convex over one or more portions of the its outer surfaces that are not against the binding members 304 (even after removing the secured bundle 300 from the bunk rack 100, as in FIGS. 4A/4B/4C). Lateral portions 303 of a lower surface of the secured bundle 300, just below the lower ends of the bundling members 304, typically assume a convex shape as tension on the binding members 310 tends to lift the peeler cores 99 in those regions up and away from the lower corners of the bunk rack 100. A central portion 305 of the lower surface of the secured bundle 300 tends to remain substantially flat against a bottom portion of the bunk rack 100, while a top portion of the secured bundle 300 tends to bulge upward and assume a convex shape. The bundling members 304 held by the tensioned binding members 310 against the sides of the secured bundle 300 keep those side surfaces substantially straight, and substantially prevent any horizontal, sideways bulging of the secured bundle 300 as it is lifted, loaded, or transported. A transverse cross section (or end view, as in FIG. 3B) of the secured bundle 300 will typically include portions 301 wherein some of the peeler cores 99 form a regular arrangement (e.g., a hexagonal array). Because no particular arranging or stacking of the peeler cores 99 in the bunk rack 100 was employed, the transverse cross section (or end view, as in FIG. 3B) of the secured bundle 300 will include other portions 302 in which the peeler cores 99 are arranged irregularly.

Figure 5A:
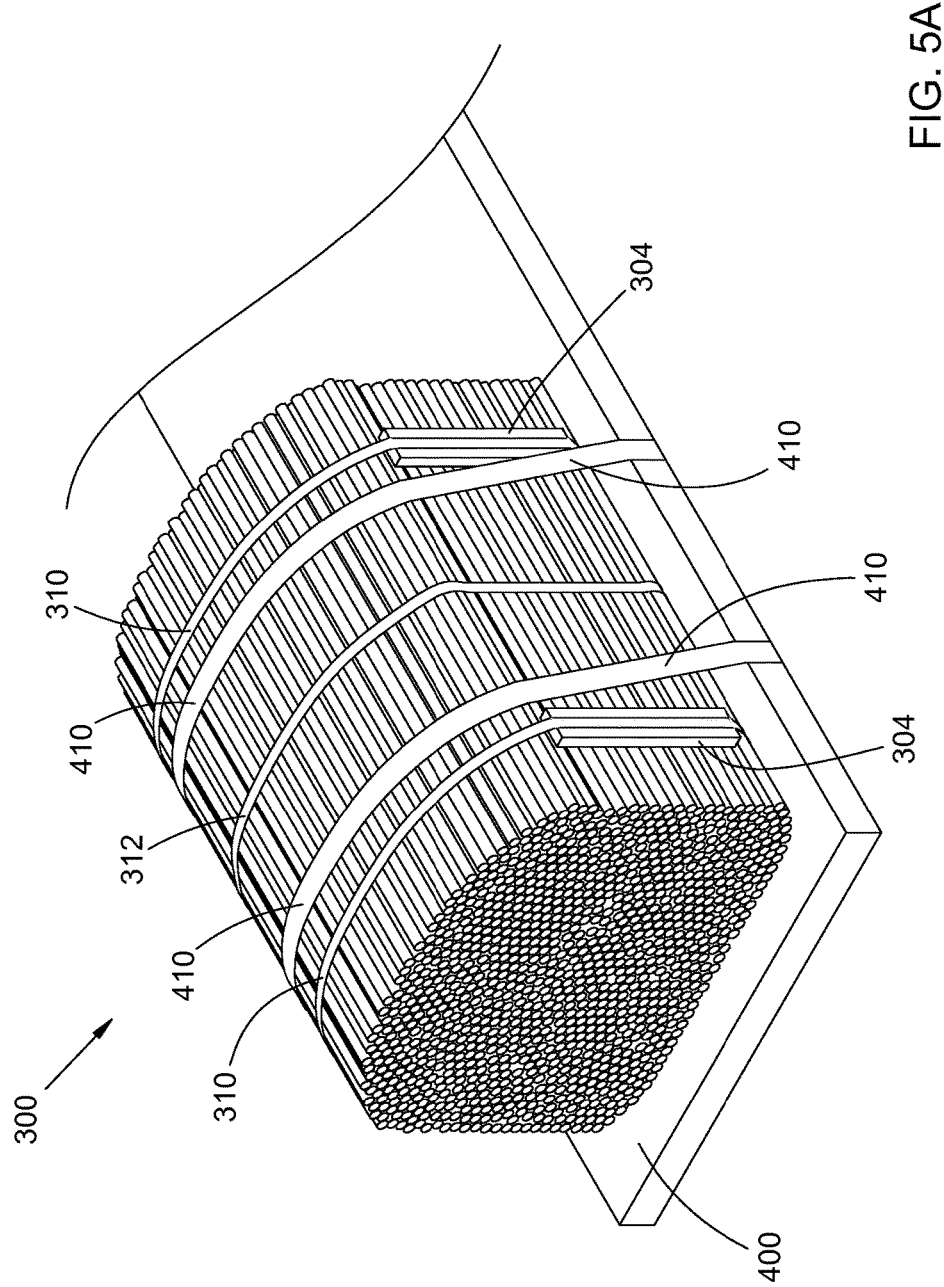
FIGS. 5A, 5B, and 5C are isometric, end, and side views, respectively, of the secured bundle of multiple elongated articles loaded on and secured to a flat bed of a truck or trailer according to the example inventive method.
Figures 5B, 5C:
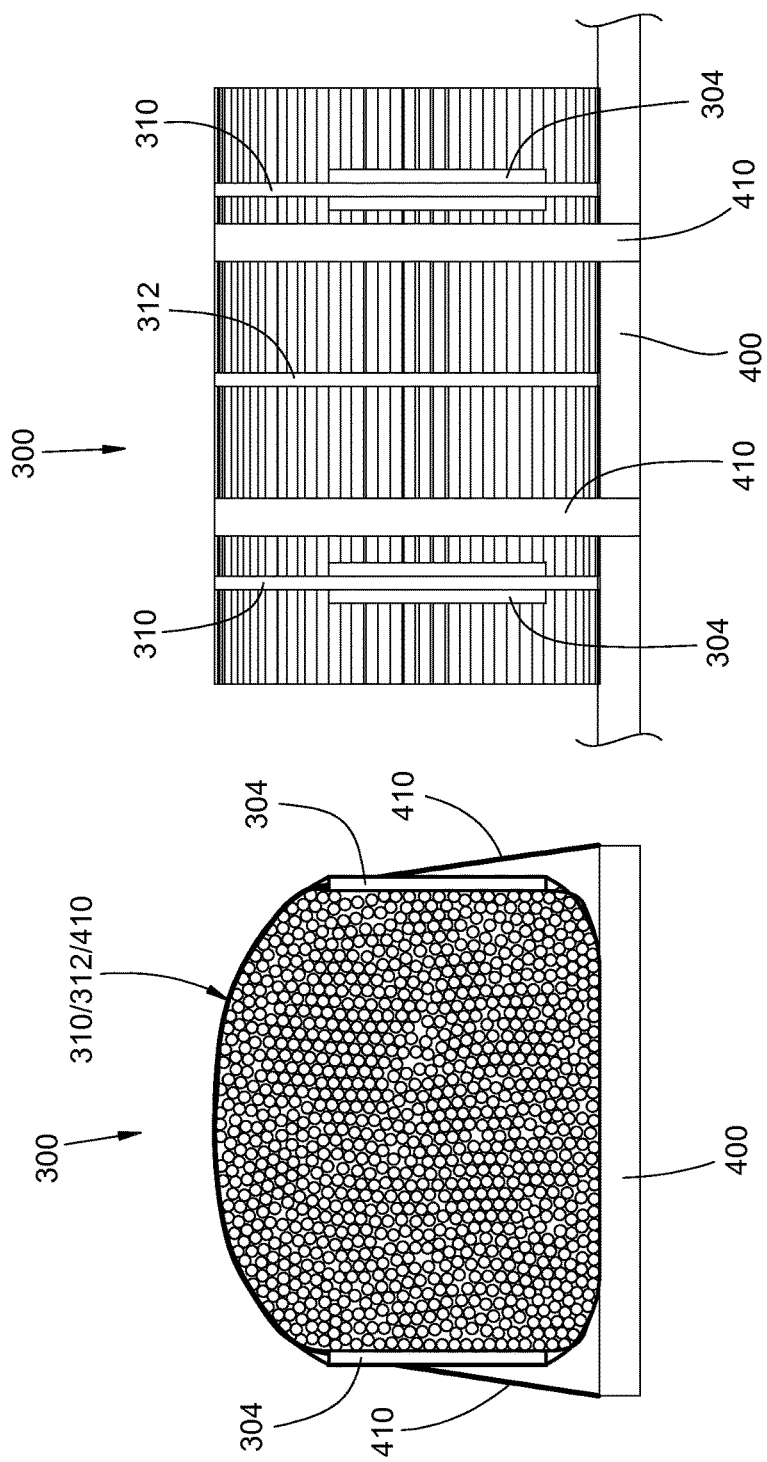

Once the secured bundle 300 is formed, it is ready to be lifted, loaded, and transported. An inventive method can further comprise lifting the secured bundle 300 out of the bunk rack 100 (FIGS. 4A/4B/4C) and placing it on a substantially flat bed 400 of a truck or trailer (FIGS. 5A/5B/5C), on one or more pallets on the bed of the truck or trailer, or on one or more blocks or rails on the bed of the truck or trailer. The secured bundle 300 is loaded with the bundling members 304 oriented substantially vertically, so as to substantially prevent horizontal, sideways bulging of the secured bundle 300 during lifting, loading, or transport. A central portion 305 of the bottom surface of the secured bundle 300 is substantially flat and rests against the bed 400 of the truck or trailer, on one or more pallets on the bed of the truck or trailer, or on one or more blocks or rails on the bed of the truck or trailer. The bunk rack 100 can be structurally arranged so as to enable the secured bundle 300 to be lifted out of the bunk rack 100 using lift forks, e.g., by providing space below at least portions of the secured bundle 300 to accommodate the lift forks (e.g., the space between the secured bundle 300 and the base members 102 provided by the cross members 103 in the example shown). The bed 400 of the truck or trailer can be similarly structurally arranged, e.g., with blocks, rails, or similar structures, that provide space below at least portions of the secured bundle 300 to accommodate the lift forks. Any other suitable lifting and loading equipment or machinery can be employed, e.g., a crane or hoist. Once loaded, the secured bundle 300 can be secured to the bed of the truck or trailer with one or more straps 410, bands, chains, bindings, or tie-downs of any suitable type or arrangement. The secured bundle 300 can remain exposed on the bed 400 of the truck or trailer, or instead can be tarped or otherwise covered or enclosed, as needed or desired.

The bed 400 of the trailer or truck need not have any special adaptation or structural arrangement to accommodate the secured bundle 300 loaded thereon. The secured bundle 300 can be treated like any other cargo suitable for loading and strapping into a flatbed truck or trailer. The truck or trailer can be used for any other suitable purpose, and after unloading the secured bundle 300 at a purchaser location need not travel back to the supplier location for any particular reason. The bundling members 304 and binding member 310 do not constitute specialized equipment or tooling, and need not be returned to the supplier location for reuse. Excess costs for two-way shipping are therefore avoided. As noted above, forming the unsecured bundle 200 and then the secured bundle 300 does not require any particular stacking or arrangement or elaborate banding of the peeler cores 99 (or other elongated articles). The inventive methods disclosed or claimed herein thereby avoid excess time and labor costs associated with conventional methods involving unitized cores.

In addition to the preceding, the following examples fall within the scope of the present disclosure or appended claims:

Example 1

A method for bundling multiple elongated articles, the method comprising: (a) loading the multiple elongated articles into a stationary bunk rack so as to form an unsecured bundle in which the elongated articles lie substantially horizontally and substantially parallel to one another; (b) positioning two or more pairs of substantially rigid, substantially straight bundling members substantially vertically against opposing sides of the unsecured bundle of the multiple elongated articles in the bunk rack with the bundling members of each pair positioned across from each other on the opposing sides of the unsecured bundle; (c) wrapping two or more flexible binding members around the unsecured bundle in the bunk rack, with each pair among the two or more pairs of bundling members having a corresponding one of the binding members positioned around the corresponding pair of bundling members positioned against the opposing sides of the unsecured bundle; (d) tensioning each one of the two or more binding members so as to urge the corresponding pairs of bundling members against the opposing sides of the unsecured bundle, so that the unsecured bundle assumes a shape that is (i) substantially flat over those portions of an outer bundle surface that are against the binding members and (ii) convex over one or more portions of the outer bundle surfaces that are not against the binding members; and (e) securing the two or more tensioned binding members so as to secure the elongated articles and the bundling members together to form a secured bundle.

Example 2

The method of Example 1 wherein, over one or more portions of a transverse cross section of the secured bundle, the elongated articles of the bundle assume an irregular arrangement.

Example 3

The method of any one of Examples 1 or 2 wherein, after part (d), a central portion of a bottom surface of the secured bundle is substantially flat and rests against a lower portion of the bunk rack.

Example 4

The method of any one of Examples 1 through 3 further comprising: (f) lifting the secured bundle out of the bunk rack and placing the secured bundle on a substantially flat bed of a truck or trailer, on one or more pallets on the bed of the truck or trailer, or on one or more blocks or rails on the bed of the truck or trailer, with the bundling members oriented substantially vertically; and (g) securing the secured bundle to the bed of the truck or trailer with one or more straps, bands, chains, bindings, or tie-downs.

Example 5

The method of Example 4 wherein, after part (f), a central portion of a bottom surface of the secured bundle is substantially flat and rests against the bed of the truck or trailer, on one or more pallets on the bed of the truck or trailer, or on one or more blocks or rails on the bed of the truck or trailer.

Example 6

The method of any one of Examples 1 through 5 wherein the binding members comprise bands, straps, or chains.

Example 7

The method of any one of Examples 1 through 6 wherein the elongated articles are substantially cylindrical.

Example 8

The method of any one of Examples 1 through 7 wherein the elongated articles are peeler cores.

Example 9

The method of any one of Examples 1 through 8 wherein the bunk rack is structurally arranged so as to enable the secured bundle to be lifted out of the bunk rack using lift forks.

Example 10

A secured bundle comprising multiple elongated articles lying substantially horizontally and substantially parallel to one another, two or more pairs of substantially rigid bundling members, and two or more binding members, wherein: (a) the two or more pairs of bundling members are positioned vertically against opposing sides of the secured bundle of the multiple elongated articles with the bundling members of each pair positioned across from each other on the opposing sides of the secured bundle; (b) the two or more flexible binding members are wrapped around the secured bundle, with each pair among the two or more pairs of bundling members having a corresponding one of the binding members positioned around the corresponding pair of bundling members positioned against the opposing sides of the secured bundle; (c) each one of the two or more binding members is tensioned so as to urge the corresponding pairs of bundling members against the opposing sides of the secured bundle, so that the secured bundle assumes a shape that is (i) substantially flat over those portions of an outer bundle surface that are against the binding members and (ii) convex over one or more portions of the outer bundle surfaces that are not against the binding members; and (d) the two or more tensioned binding members are secured so as to secure the elongated articles and the bundling members together to form the secured bundle.

Example 11

The secured bundle of Example 10 wherein, over one or more portions of a transverse cross section of the secured bundle, the elongated articles of the bundle assume an irregular arrangement.

Example 12

The secured bundle of any one of Examples 10 or 11 further comprising a stationary bunk rack, wherein the secured bundle is positioned in the bunk rack.

Example 13

The secured bundle of Example 12 wherein a central portion of a bottom surface of the secured bundle is substantially flat and rests against a bottom portion of the bunk rack.

Example 14

The secured bundle of any one of Examples 12 or 13 wherein the bunk rack is structurally arranged so as to enable the secured bundle to be lifted using lift forks.

Example 15

The secured bundle of any one of Examples 10 or 11 further comprising a truck or trailer, wherein: (e) the secured bundle rests on a substantially flat bed of the truck or trailer, on one or more pallets on the bed of the truck or trailer, or on one or more blocks or rails on the bed of the truck or trailer, with the bundling members oriented substantially vertically; and (f) the secured bundle is secured to the bed of the truck or trailer with one or more straps, bands, chains, bindings, or tie-downs.

Example 16

The secured bundle of Example 15 wherein a central portion of a bottom surface of the secured bundle is substantially flat and rests against the bed of the truck or trailer, on one or more pallets on the bed of the truck or trailer, or on one or more blocks or rails on the bed of the truck or trailer.

Example 17

The secured bundle of any one of Examples 15 or 16 wherein the bed of the truck or trailer is structurally arranged so as to enable the secured bundle to be lifted using lift forks.

Example 18

The secured bundle of any one of Examples 10 through 17 wherein the binding members comprise bands, straps, or chains.

Example 19

The secured bundle of any one of Examples 10 through 18 wherein the elongated articles are substantially cylindrical.

Example 20

The secured bundle of any one of Examples 10 through 19 wherein the elongated articles are peeler cores.

It is intended that equivalents of the disclosed example embodiments and methods shall fall within the scope of the present disclosure or appended claims. It is intended that the disclosed example embodiments and methods, and equivalents thereof, may be modified while remaining within the scope of the present disclosure or appended claims.

In the foregoing Detailed Description, various features may be grouped together in several example embodiments for the purpose of streamlining the disclosure. This method of disclosure is not to be interpreted as reflecting an intention that any claimed embodiment requires more features than are expressly recited in the corresponding claim. Rather, as the appended claims reflect, inventive subject matter may lie in less than all features of a single disclosed example embodiment. Thus, the appended claims are hereby incorporated into the Detailed Description, with each claim standing on its own as a separate disclosed embodiment. However, the present disclosure shall also be construed as implicitly disclosing any embodiment having any suitable set of one or more disclosed or claimed features (i.e., a set of features that are neither incompatible nor mutually exclusive) that appear in the present disclosure or the appended claims, including those sets that may not be explicitly disclosed herein. In addition, for purposes of disclosure, each of the appended dependent claims shall be construed as if written in multiple dependent form and dependent upon all preceding claims with which it is not inconsistent. It should be further noted that the scope of the appended claims does not necessarily encompass the whole of the subject matter disclosed herein.

For purposes of the present disclosure and appended claims, the conjunction "or" is to be construed inclusively (e.g., "a dog or a cat" would be interpreted as "a dog, or a cat, or both"; e.g., "a dog, a cat, or a mouse" would be interpreted as "a dog, or a cat, or a mouse, or any two, or all three"), unless: (i) it is explicitly stated otherwise, e.g., by use of "either . . . or," "only one of," or similar language; or (ii) two or more of the listed alternatives are mutually exclusive within the particular context, in which case "or" would encompass only those combinations involving non-mutually-exclusive alternatives. For purposes of the present disclosure and appended claims, the words "comprising," "including," "having," and variants thereof, wherever they appear, shall be construed as open ended terminology, with the same meaning as if the phrase "at least" were appended after each instance thereof, unless explicitly stated otherwise.

In the appended claims, if the provisions of 35 USC §112(f) are desired to be invoked in an apparatus claim, then the word "means" will appear in that apparatus claim. If those provisions are desired to be invoked in a method claim, the words "a step for" will appear in that method claim. Conversely, if the words "means" or "a step for" do not appear in a claim, then the provisions of 35 USC §112(f) are not intended to be invoked for that claim.

If any one or more disclosures are incorporated herein by reference and such incorporated disclosures conflict in part or whole with, or differ in scope from, the present disclosure, then to the extent of conflict, broader disclosure, or broader definition of terms, the present disclosure controls. If such incorporated disclosures conflict in part or whole with one another, then to the extent of conflict, the later-dated disclosure controls.

The Abstract is provided as required as an aid to those searching for specific subject matter within the patent literature. However, the Abstract is not intended to imply that any elements, features, or limitations recited therein are necessarily encompassed by any particular claim. The scope of subject matter encompassed by each claim shall be determined by the recitation of only that claim.

What is claimed is:

1. A secured bundle comprising multiple elongated articles lying substantially horizontally and substantially parallel to one another, two or more pairs of substantially rigid bundling members, and two or more flexible binding members, wherein:
    (a) the two or more pairs of bundling members are positioned vertically against opposing sides of the secured bundle of the multiple elongated articles with the bundling members of each pair positioned across from each other on the opposing sides of the secured bundle;
    (b) the two or more flexible binding members are wrapped around the secured bundle, with each pair among the two or more pairs of bundling members having a corresponding one of the binding members positioned around the corresponding pair of bundling members positioned against the opposing sides of the secured bundle so as to encircle the secured bundle and the corresponding pair of bundling members;
    (c) each one of the two or more binding members is tensioned so as to urge the corresponding pairs of bundling members against the opposing sides of the secured bundle, so that the secured bundle assumes a shape that is (i) substantially flat over those portions of an outer bundle surface that are against the bundling members and (ii) convex over one or more portions of the outer bundle surface that are not against the bundling members;
    (d) the two or more tensioned binding members are secured so as to secure the elongated articles and the bundling members together to form the secured bundle with the bundling members held in place against the secured bundle by only the tensioned binding members, without attachment to or contact with another structural member.

2. A method for producing the secured bundle of claim 1, the method comprising:
    (A) loading the multiple elongated articles into a stationary bunk rack so as to form an unsecured bundle in which the elongated articles lie substantially horizontally and substantially parallel to one another;
    (B) positioning the two or more pairs of substantially rigid bundling members substantially vertically against opposing sides of the unsecured bundle of the multiple elongated articles in the bunk rack with the bundling members of each pair positioned across from each other on the opposing sides of the unsecured bundle;
    (C) wrapping the two or more flexible binding members around the unsecured bundle in the bunk rack, with each pair among the two or more pairs of bundling members having a corresponding one of the binding members positioned around the corresponding pair of bundling members positioned against the opposing sides of the unsecured bundle so as to encircle the unsecured bundle and the corresponding pair of bundling members;
    (D) tensioning each one of the two or more binding members so as to urge the corresponding pairs of bundling members against the opposing sides of the unsecured bundle, so that the unsecured bundle assumes the shape of the secured bundle that is (i) substantially flat over those portions of the outer bundle surface that are against the bundling members and (ii)

convex over one or more portions of the outer bundle surface that are not against the bundling members; and (E) securing the two or more tensioned binding members so as to secure the elongated articles and the bundling members together to form the secured bundle with the bundling members held in place against the secured bundle by only the tensioned binding members, without attachment to or contact with another structural member.

3. The method of claim 2 wherein, after part (D), a central portion of a bottom surface of the secured bundle is substantially flat and rests against a lower portion of the bunk rack.

4. The method of claim 2 further comprising:

(F) lifting the secured bundle out of the bunk rack and placing the secured bundle on a substantially flat bed of a truck or trailer, on one or more pallets on the bed of the truck or trailer, or on one or more blocks or rails on the bed of the truck or trailer, with the bundling members oriented substantially vertically; and (G) securing the secured bundle to the bed of the truck or trailer with one or more straps, bands, chains, bindings, or tie-downs.

5. The method of claim 4 wherein, after part (F), a central portion of a bottom surface of the secured bundle is substantially flat and rests against the bed of the truck or trailer, on one or more pallets on the bed of the truck or trailer, or on one or more blocks or rails on the bed of the truck or trailer.

6. The method of claim 2 wherein the binding members comprise bands, straps, or chains.

7. The method of claim 2 wherein the elongated articles are substantially cylindrical.

8. The method of claim 2 wherein the elongated articles are peeler cores.

9. The method of claim 2 wherein the bunk rack is structurally arranged so as to enable the secured bundle to be lifted out of the bunk rack using lift forks.

10. The method of claim 2 wherein, over one or more portions of a transverse cross section of the secured bundle, the elongated articles of the secured bundle assume an irregular arrangement.

11. The secured bundle of claim 1 wherein, over one or more portions of a transverse cross section of the secured bundle, the elongated articles of the bundle assume an irregular arrangement.

12. The secured bundle of claim 1 further comprising a stationary bunk rack, wherein the secured bundle is positioned in the bunk rack.

13. The secured bundle of claim 12 wherein a central portion of a bottom surface of the secured bundle is substantially flat and rests against a bottom portion of the bunk rack.

14. The secured bundle of claim 12 wherein the bunk rack is structurally arranged so as to enable the secured bundle to be lifted using lift forks.

15. The secured bundle of claim 1 further comprising a truck or trailer, wherein:

(e) the secured bundle rests on a substantially flat bed of the truck or trailer, on one or more pallets on the bed of the truck or trailer, or on one or more blocks or rails on the bed of the truck or trailer, with the bundling members oriented substantially vertically; and (f) the secured bundle is secured to the bed of the truck or trailer with one or more straps, bands, chains, bindings, or tie-downs.

16. The secured bundle of claim 15 wherein a central portion of a bottom surface of the secured bundle is substantially flat and rests against the bed of the truck or trailer, on one or more pallets on the bed of the truck or trailer, or on one or more blocks or rails on the bed of the truck or trailer.

17. The secured bundle of claim 15 wherein the bed of the truck or trailer is structurally arranged so as to enable the secured bundle to be lifted using lift forks.

18. The secured bundle of claim 1 wherein the binding members comprise bands, straps, or chains.

19. The secured bundle of claim 1 wherein the elongated articles are substantially cylindrical.

20. The secured bundle of claim 1 wherein the elongated articles are peeler cores.

* * * * *